(12) United States Patent
He et al.

(10) Patent No.: US 8,618,816 B2
(45) Date of Patent: Dec. 31, 2013

(54) MEASURING DEVICE WITH A MICRO-ELECTROMECHANICAL CAPACITIVE SENSOR

(75) Inventors: Lin He, Freiburg (DE); Yiannos Manoli, Freiburg (DE); Alexander Buhmann, Stuttgart (DE); Armin Taschwer, Sigolsheim (FR); Thomas Northemann, Freiburg (DE)

(73) Assignee: Albert-Ludwigs-Universität Freiburg, Freiburg (DE)

( * ) Notice: Subject to any disclaimer, the term of this patent is extended or adjusted under 35 U.S.C. 154(b) by 428 days.

(21) Appl. No.: 13/002,926

(22) PCT Filed: Jul. 6, 2009

(86) PCT No.: PCT/EP2009/004868
§ 371 (c)(1),
(2), (4) Date: Jan. 6, 2011

(87) PCT Pub. No.: WO2010/003612
PCT Pub. Date: Jan. 14, 2010

(65) Prior Publication Data
US 2011/0115501 A1    May 19, 2011

(30) Foreign Application Priority Data
Jul. 7, 2008   (DE) .......................... 10 2008 031 609

(51) Int. Cl.
*G01R 27/26* (2006.01)
(52) U.S. Cl.
USPC .......................................... 324/661

(58) Field of Classification Search
USPC ................. 324/658–690; 73/504.12, 514.32; 330/252–254, 260
See application file for complete search history.

(56) References Cited

U.S. PATENT DOCUMENTS 5,666,087 A * 9/1997 Gorecki ........................ 330/260
6,250,156 B1   6/2001 Seshia et al.

OTHER PUBLICATIONS

Geen et al., "Single-Chip Surface Micromachined Integrated Gyroscope With 50°/h Allan Deviation", IEEE Journal of Solid-State Circuits, Dec. 2002, pp. 1860-1866, vol. 37, No. 12.

\* cited by examiner

*Primary Examiner* — Melissa Koval
*Assistant Examiner* — Daniel Miller
(74) *Attorney, Agent, or Firm* — The Webb Law Firm, P.C.

(57) ABSTRACT

A measuring device has a micro-electromechanical capacitive sensor which has electrodes which move toward and away from each other for measurement of a mechanical deflection of a test mass. The measuring device has a charge integrator which has an operating amplifier which has at least one amplifier input connected to the sensor and an amplifier output which is fed back to the amplifier input via an integration capacitor. The amplifier input is connected via a high-resistance electrical resistor to a terminal for an electrical common-mode reference potential. In addition to the amplifier input, the operating amplifier has an auxiliary input. The amplifier output is connected to the auxiliary input via a deep pass.

18 Claims, 5 Drawing Sheets

MEASURING DEVICE WITH A MICRO-ELECTROMECHANICAL CAPACITIVE SENSOR

BACKGROUND OF THE INVENTION

1. Field of the Invention

The invention relates to a measuring device with at least one micro-electromechanical capacitive sensor, which has electrodes that move toward and away from each other for measurement of a mechanical deflection of a test mass, with a charge integrator comprising an operational amplifier that has at least one amplifier input connected to the sensor and at least one amplifier output that is fed back to the amplifier input via at least one integration capacitor.

2. Description of Related Art

Such a measuring device is disclosed in Green, J. et al. "Single-Chip Surface Micromachined Integrated Gyroscope with 50°/h Allan Deviation," IEEE Journal of Solid State Circuits, vol. 37, no. 12 (2002), pp. 1860-1866. The measuring device is part of a gyroscope that comprises a test mass, which is deflected from a rest position against a spring force of a first spring toward a first axis, and against a spring force of a second spring toward a second axis at 90 degrees relative to the first axis. The gyroscope has an electromechanical oscillator, which comprises an excitation mechanism by means of which the test mass is set into a primary oscillation toward the first axis. The movement of the test mass toward the first axis is measured by means of a primary capacitive sensor. By means of a feedback loop, a rectangular voltage is generated as a function of the measuring signal thus received and said voltage is applied to a capacitive actuator driving the test mass. The phasing of the rectangular voltage is selected so that the test mass oscillates with the resonance frequency of the primary resonator formed by the first spring and the test mass.

A turning of the test mass about a rotation axis running perpendicular to the first axis and to the second axis generates a Coriolis force, which brings about a secondary oscillation of the test mass toward the second axis. The corresponding deflection is measured by means of a secondary capacitive sensor. Because the Coriolis deflection of the test mass is less than 2 Å, the measuring signal of the secondary sensor is amplified. To this end, the secondary sensor is connected to an amplifier input of an operational amplifier, of which the amplifier output is fed back to the amplifier input via an integration capacitor to form a charge integrator. Connected in parallel to the integration capacitor is a source-drain channel of a field effect transistor (FET), which forms a gigaohm resistor and counteracts a displacement of the DC voltage potential at the amplifier input. By means of the resistor, the operational amplifier is prevented from over-modulating due to an existing input offset voltage. In practice, however, the measuring device may not be optimally in tune with the primary resonator. Hence, there is room for improvement of the gyroscope's measuring sensitivity.

The object is therefore to create a measuring device of the aforementioned type with which a high measuring sensitivity is achievable.

SUMMARY OF THE INVENTION

This object is achieved wherein the at least one amplifier input is connected via a high-resistance electrical resistor to a terminal for an electrical common-mode reference potential, wherein the operational amplifier has at least one auxiliary input in addition to the at least one amplifier input, and wherein the amplifier output is connected via a low pass to the at least one auxiliary input.

It is thus advantageously possible to set the common-mode reference potential to a predetermined value and thus adjust the resonance frequency of the primary resonator formed from the test mass and a spring, against the reset force of which the test mass is deflectable in the motion direction of the electrodes moving toward and away from each other. For a measuring device used for measuring the Coriolis deflection in a gyroscope, it is thus possible to adapt the resonance frequency of the secondary oscillator formed from the test mass and the spring to the resonance frequency of the primary resonator. Because a resetting of the integration capacitor is unnecessary, owing to the resistors connected to the common-mode reference potential, the integration capacitor can be continuously used for the measurement. In addition, the measuring device enables a specific DC voltage level at the output of the operational amplifier. Furthermore, the measuring device is not sensitive to a sensor offset voltage. The working point of the operational amplifier is set with a low pass-filtered signal so that the circuit part of the operational amplifier associated with the auxiliary input can be configured with a low frequency.

The measuring device of the invention is not limited to use in a gyroscope. In fact, it can also be used for other capacitive micro-electromechanical systems (MEMS) such as an acceleration sensor or a microphone. If need be, the common-mode reference potential can be programmable. Preference is given to the resistance value of the high-resistance resistor being in the gigaohm range. The charge integrator of the invention exhibits very little random noise compared to a transimpedance amplifier, thereby resulting in correspondingly low power consumption by the measuring device. Hence, the measuring device is well-suited for battery operation, for instance when it is built into a portable device. A low random noise level and low power consumption can also be achieved by configuring the charge integrator as a continuous-time charge integrator. The convolutional noise is thus eliminated in contrast to a clocked, discrete-time charge integrator.

Because the common-mode signal at the amplifier output of the common-mode reference potential is fed back to the amplifier input, the operational amplifier can have a stacked circuit structure.

It is advantageous if the high-resistance electrical resistor is configured as a FET, particularly a MOSFET, which connects the amplifier input to the terminal for the common-mode reference potential with its source-drain channel and applies a control voltage with its gate. The high-resistance resistor can thus be integrated along with the operational amplifier and optionally with other electric circuit parts in a semiconductor chip in a cost effective and space-saving manner.

The control voltage is advantageously lower than the threshold voltage of the MOSFET. A very high-resistance electrical resistor is thus achievable.

In a preferred embodiment of the invention, the measuring device has a voltage source for generating the control voltage of which the source output is connected to the MOSFET gate, wherein the voltage source has a control input that is control-connected to the terminal for the common-mode reference potential in such a way that the electrical resistance of the MOSFET source-drain channel essentially remains constant when a change in the common-mode reference potential occurs. The common-mode reference potential can then be adjusted in an expedient manner without changing the value of the high-resistance electrical resistor.

In an advantageous embodiment of the invention, the capacitive sensor is configured as a differential sensor with a non-inverting first measuring signal output and an inverting second measuring signal output and the operational amplifier is configured as a differential operational amplifier with a non-inverting first amplifier input, an inverting second amplifier input, a non-inverting first amplifier output, and an inverting second amplifier output, wherein the first measuring signal output is connected to the first amplifier input and the second measuring signal output is connected to the second amplifier input, wherein the first amplifier output is fed back via a first integration capacitor to the second amplifier input and the second amplifier output is fed back via a second integration capacitor to the first amplifier input, and wherein the first amplifier input is connected via a high-resistance first resistor and the second amplifier input is connected via a high-resistance second resistor to the terminal for the common-mode reference potential. The measuring device is therefore configured as a differential measuring device and thus enables an even greater measuring sensitivity. Preference is given to the high-resistance resistors having about the same resistance value.

The operational amplifier advantageously comprises a first non-inverting auxiliary input in addition to the first amplifier input and a second inverting auxiliary input in addition to the second amplifier input, wherein the second amplifier output is connected to a non-inverting first input terminal of a low pass and the first amplifier output is connected to an inverting second input terminal of the low pass, and wherein a non-inverting first output terminal of the low pass is connected to the first auxiliary input and an inverting second output terminal of the low pass is connected to the second auxiliary input. The working point of the operational amplifier is thus adjusted by means of a differential, low-pass-filtered signal.

However, it is also possible for the operational amplifier to comprise a first non-inverting auxiliary input in addition to the first amplifier input and a second inverting auxiliary input in addition to the second amplifier input, wherein the first amplifier output is connected to a non-inverting first input terminal of a low pass and the second amplifier output is connected to an inverting second input terminal of the low pass, and wherein an inverting first output terminal of the low pass is connected to a first auxiliary input and a non-inverting second output terminal of the low pass is connected to the second auxiliary input. The working point of the operational amplifier is set by means of a differential low-pass-filtered signal in this embodiment of the invention as well.

It is advantageous if the second amplifier output is connected via a first resistor element to the first input terminal of the low pass and the first amplifier output is connected via a second resistor element to the second input terminal of the low pass, and if the first input terminal of the low pass is connected via a third resistance element to the second input terminal of the low pass. A measuring device with a high amplitude output signal is achievable with the resistor network thus formed. Thus, the measuring device can even be used for measuring the primary oscillation of a test mass in an electromechanical oscillator.

The low pass advantageously has at least one voltage-controlled current source, of which the output is connected to an integration input of a Miller integrator. The low pass is thus more easily able to be integrated in a semiconductor chip. It is thus possible to dispense with a complex and expensive external capacitor.

In a preferred embodiment of the invention, the first input terminal of the low pass is connected to a first transconductor input and the second input terminal of the low pass is connected to a second transconductor input, wherein the first output terminal of the low pass is connected to the first transconductor output and the second output terminal of the low pass is connected to the second transconductor output, and wherein the second transconductor output is connected via a first feedback branch to a first feedback terminal of the first transconductor and the first transconductor output is connected via a second feedback branch to a second feedback terminal of the first transconductor. High output amplitude and a largely linear amplification of the sensor measuring signal are thus achievable with the measuring device.

It is advantageous if the first output terminal of the low pass is connected to a reference potential terminal via a first path comprising a source-drain channel of a first FET and a current source connected in series therewith, if the second output terminal of the low pass is connected to the reference potential terminal via a second path comprising a source-drain channel of a second FET and another current source connected in series therewith, and if the gate of the first FET and the gate of the second FET are in each case connected to a control mechanism, which is configured in such a way that the FETs are operated below their threshold voltage. It is thus possible to dispense with a large on-chip capacitor for the low pass.

The measuring device of the invention can be part of a gyroscope, which comprises a test mass on a holding device mounted deflectably along a first axis and along a second axis running perpendicular thereto, and which can be set to oscillate about a rest position toward the first axis by means of a vibration exciter, wherein the capacitive sensor cooperates with the test mass in such a way that a deflection of the test mass from the rest position toward the second axis is detectable. High sensitivity, low current consumption, and large output amplitude are thus achieved with the gyroscope.

BRIEF DESCRIPTION OF THE DRAWINGS

Illustrative embodiments of the invention are explained in greater detail in the following, with reference to the drawing. Shown are.

DESCRIPTION OF THE PREFERRED EMBODIMENTS

Figure 1:
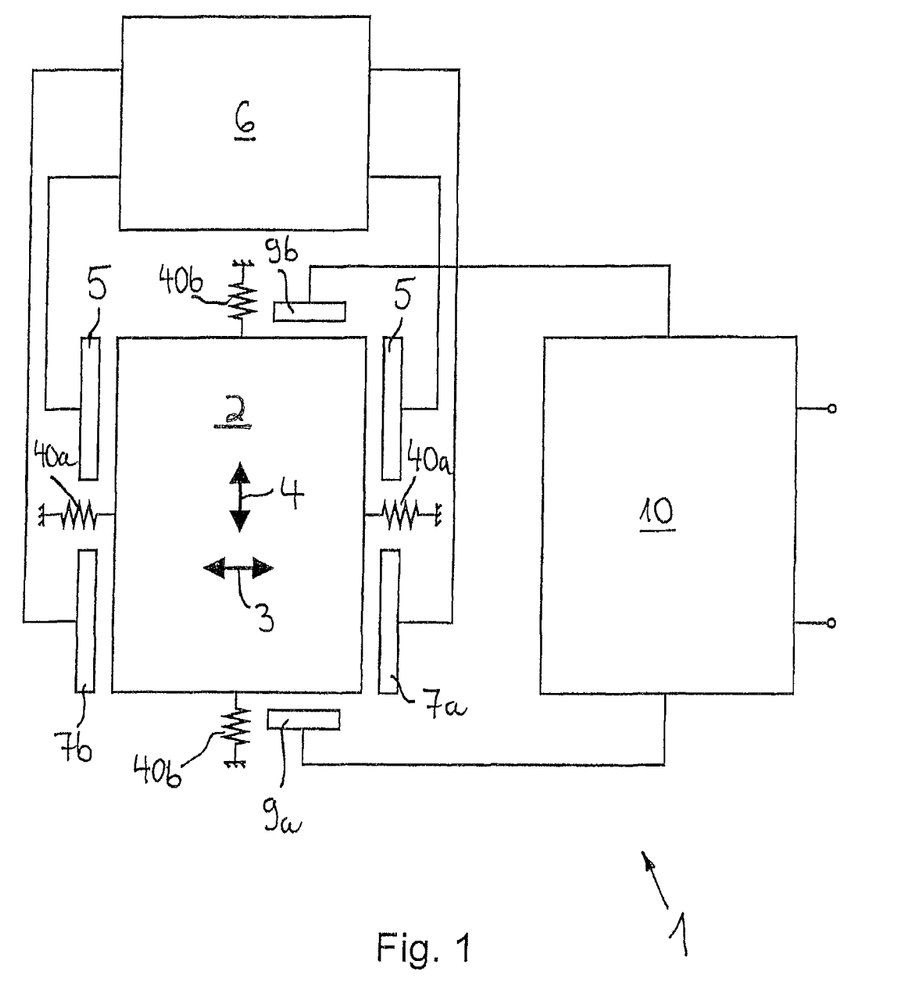
FIG. 1: a schematic illustration of a gyroscope comprising an electromechanical oscillator and a measuring device for measuring a deflection of a test mass induced by a Coriolis force.

A gyroscope designated in its entirety by 1 in FIG. 1 has a test mass 2, which is micromechanically mounted on a holding device (not illustrated in any greater detail in the drawing) so that it is deflectable from a rest position along a first axis 3 against the reset force of a pair of first springs 40a and along a second axis 4 running perpendicular thereto against the reset force of a pair of second springs 40b. The holding device can be, for example, a semiconductor chip on which or in which is arranged the test mass 2.

The test mass 2 can be set into oscillation about the rest position toward the first axis 3 by means of a vibration exciter. The vibration exciter comprises capacitive actuators 5 with a first and a second electrode in each case. The first electrode is connected in each case to the holding device and the second electrode is connected in each case to the test mass 2.

For applying an oscillation-inducing AC voltage, the electrodes of the actuators 5 are connected to driver outputs of a control mechanism 6. The control mechanism 6 comprises differential measuring signal inputs, which are connected to primary capacitive sensors 7a, 7b for measuring the oscillatory motion of the test mass 2. In FIG. 1 it can be discerned that the test mass 2 is arranged between the primary sensors 7a, 7b. Each primary sensor 7a, 7b always has a first electrode connected to the test mass 2 and a second electrode connected to the holding device.

If the test mass 2 is displaced from its rest position toward the first axis 3, the electrodes of one of the primary sensors 7a, 7b move toward each other and the electrodes of the other primary sensor 7b, 7a move away from each other. As a result the measuring signals of the primary sensors 7a, 7b change in opposite directions relative to one another.

As a function of the measuring signals of the primary sensors 7a, 7b, the phasing of the AC voltage applied to the electrodes of actuators 5 is regulated by means of the control mechanism 6 in such a way that the test mass oscillates about the rest position toward the first axis 3 with a resonance frequency.

If the holding device and thus the position of the test mass 2 are rotated about a rotation axis aligned normally to the first axis 3 and to the second axis 4, a Coriolis force is exerted on the test mass 2, which acts toward the second axis 4 and deflects the test mass 2 against the reset forces of the second springs 40b from the rest position toward the second axis 4.

For measuring this deflection, the gyroscope 1 has a measuring device 8 comprising two secondary micro-electromechanical capacitive sensors 9a, 9b and an evaluation circuit 10 connected thereto. In FIG. 1 it can be discerned that the test mass 2 is arranged between the secondary sensors 9a, 9b. Each secondary sensor 9a, 9b always has a first electrode connected to the test mass 2 and a second electrode connected to the holding device.

If the test mass 2 is displaced from its rest position toward the second axis 4, the electrodes of one of the secondary sensors 9a, 9b move toward each other and the electrodes of the other secondary sensor 9b, 9a move away from each other. As a result the measuring signals of the secondary sensors 9b, 9a change in opposite directions relative to one another.

Figure 2:
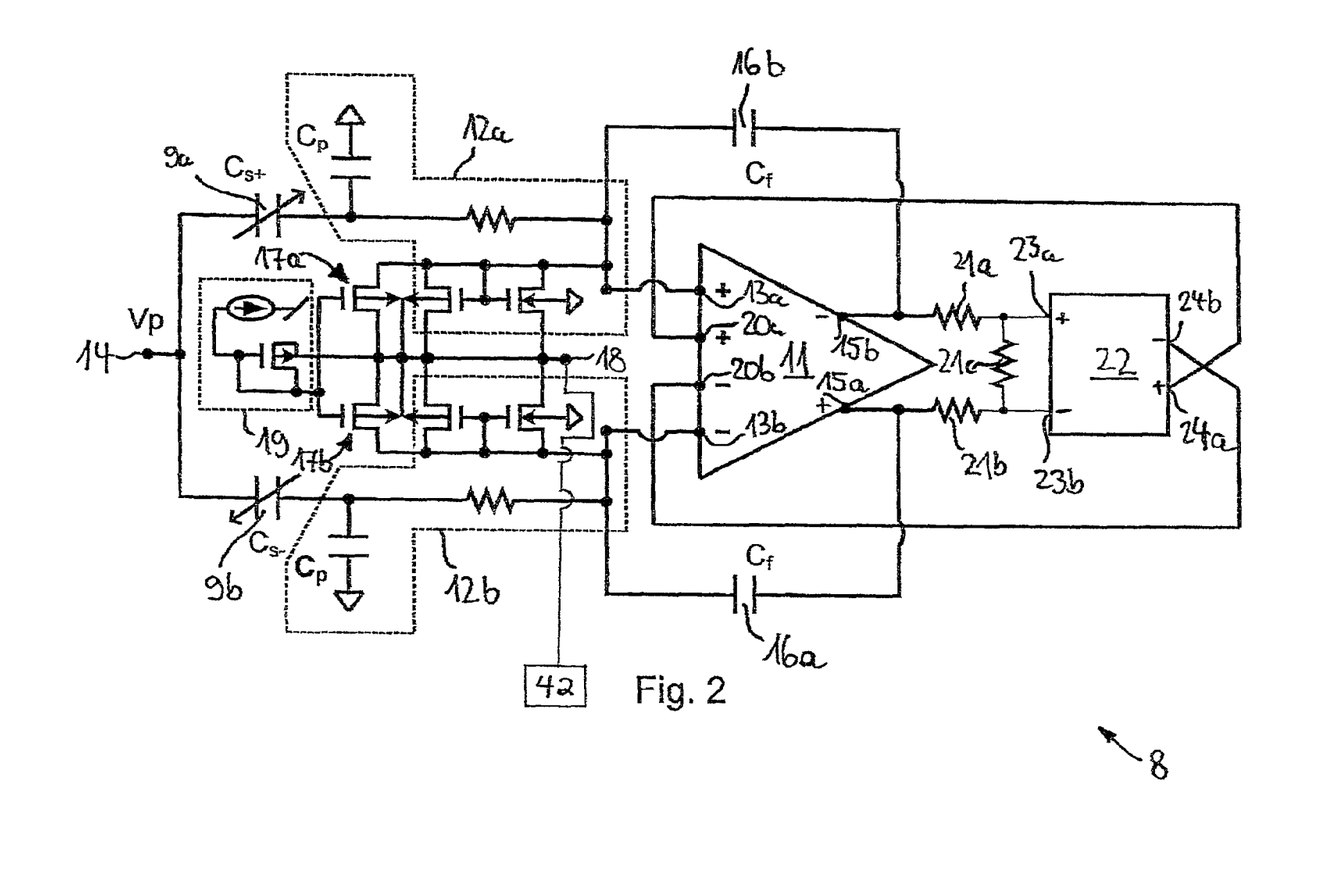
FIG. 2: a circuit diagram of the measuring device.

As can be discerned in FIG. 2, a first electrode of a first secondary sensor 9a forming a first measuring signal output is connected via a first protective circuit 12a to a non-inverting amplifier input 13a of an operational amplifier 11. A second electrode of the first secondary sensor 9a is connected to a terminal 14 for a reference potential.

Analogously, a first electrode of a second secondary sensor 9b forming a second measuring signal output is connected via a second protective circuit 12b to an inverting amplifier input 13b of the operational amplifier 11. A second electrode of the second secondary sensor 9b is connected to the terminal 14 for the reference potential.

The operational amplifier 11 is part of a charge integrator. To this end, a non-inverting amplifier output 15a is fed back via a first integration capacitor 16a to the inverting amplifier input 13b. An inverting amplifier output 15b is fed back via a second integration capacitor 16b to the non-inverting amplifier input 13a. It is clearly discernible that an electrical resistor is not connected in parallel to the first integration capacitor 16a, nor to the second integration capacitor 16b.

The non-inverting amplifier input 13a is connected via a first electrical resistor 17a to a terminal 18 for an electrical common-mode reference potential. Analogously, the inverting amplifier input 13b is connected via a second electrical resistor 17b to the terminal 18 for the electrical common-mode reference potential.

The resistors 17a, 17b are in each case formed by the source-drain channel of a MOSFET. The gate electrodes of the MOSFETs are connected to a voltage source 19, which provides a control voltage that is lower than the threshold voltage of the MOSFET.

The common-mode reference potential is adjustable and is generated by means of a reference voltage source 42. By changing the common-mode reference potential, the resonance frequency of the secondary oscillator formed from the second springs 40b and the test mass can be tuned to the resonance frequency of the primary resonator formed from the first springs 40a and the test mass 2. A high sensitivity of the measuring device 8 is thus achieved.

The operational amplifier 11 comprises a non-inverting auxiliary input 20a in addition to the non-inverting amplifier input 13a and an inverting auxiliary input 20b in addition to the inverting amplifier input 13b. The inverting amplifier output 15b is connected via a first resistor element 21a to a non-inverting input terminal 23a of a low pass 22. The non-inverting amplifier output 15a is connected via a second resistor element 21b to an inverting input terminal 23b of the low pass. A third resistor element 21c connects the non-inverting input terminal 23a to the inverting input terminal 23b of the low pass. Greater output amplitude of the operational amplifier 11 is thus achieved.

For setting the working point of the operational amplifier 11, a non-inverting output terminal 24a of the low pass 22 is connected to the non-inverting auxiliary input 20a of the operational amplifier 11 and an inverting second output terminal 24b of the low pass 22 is connected to the inverting auxiliary input 20b of the operational amplifier 11.

Figure 3:
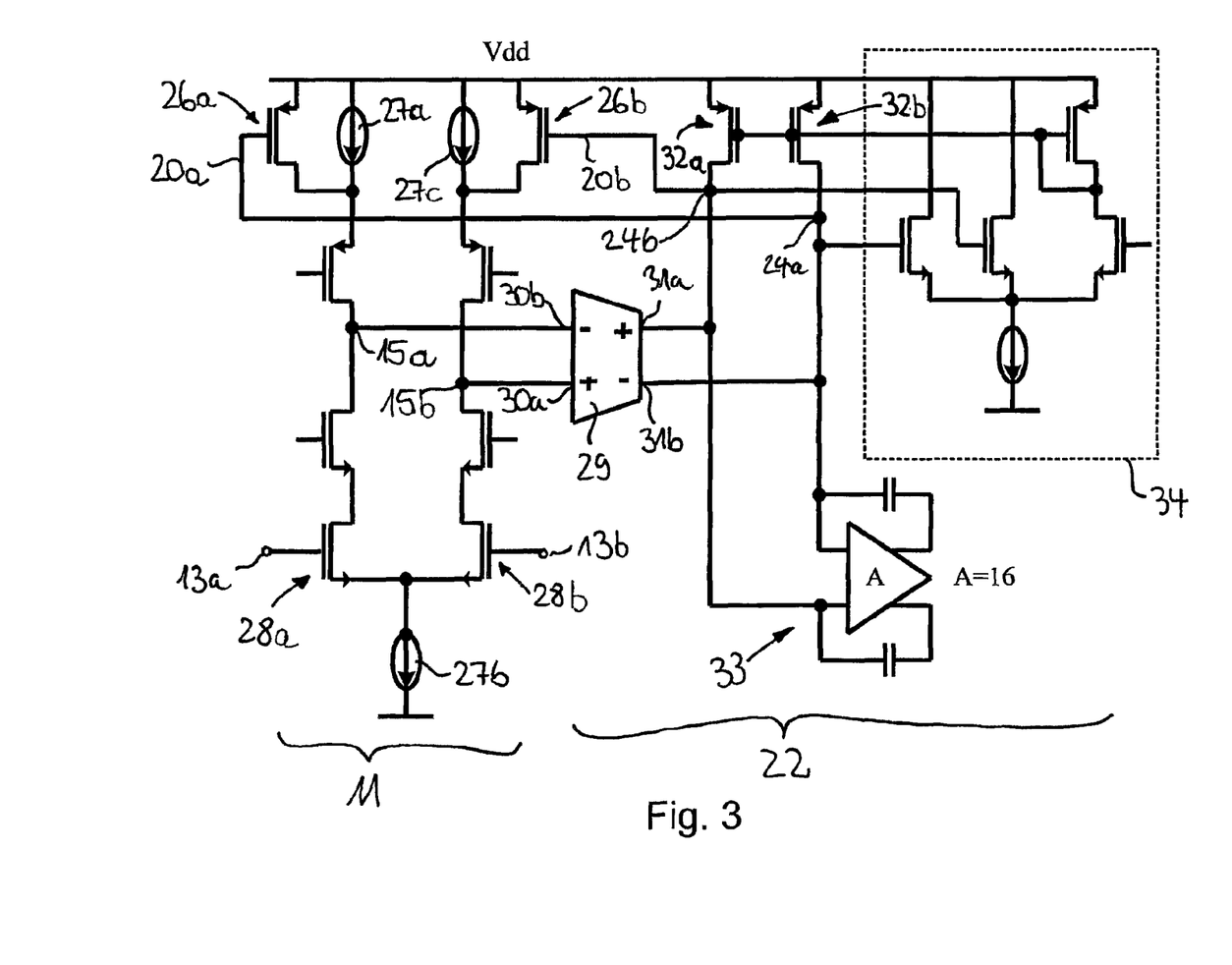
FIG. 3: a circuit diagram of an amplifier circuit for a charge integrator, wherein the amplifier circuit comprises an operational amplifier, the output of which is fed back via a low pass to the amplifier input of the operational amplifier.

It can be discerned in FIG. 3 that the non-inverting auxiliary input 20a of the operational amplifier 11 is formed by the gate of a first MOSFET 26a, a first current source 27a being connected in parallel to the source-drain channel thereof. The source of the first MOSFET 26a is connected to a first supply voltage terminal. To the source-drain channel of a first MOSFET 26a is connected in series the source-drain channel of a second MOSFET 28a, the gate of which forms the inverting amplifier input 13b. The non-inverting amplifier output 15a is arranged in a first circuit branch connecting the drain of the first MOSFET 26a to the drain of the second MOSFET 28a. The source of the second MOSFET 28a is connected via a second current source 27b to a second supply voltage terminal.

The inverting auxiliary output 20b of the operational amplifier 11 is formed by the gate of a third MOSFET 26b, a third current source 27c being connected in parallel to the source-drain channel thereof. The source of the third MOSFET 26b is connected to the first supply voltage terminal. To the source-drain channel of the third MOSFET 26b is connected in series the source-drain channel of a fourth MOSFET 28b, the gate of which forms the non-inverting amplifier input 13a. The inverting amplifier output 15b is arranged in a second circuit branch connecting the drain of the third MOSFET 26b to the drain of the fourth MOSFET 28b. The source of the fourth MOSFET 28b is connected via the second current source 27b to the second supply voltage terminal.

It can be further discerned in FIG. 3 that the low pass 22 comprises a voltage-controlled current source 29 (gm cell) with a non-inverting input 30a and an inverting input 30b. The non-inverting input 30a is connected to the inverting amplifier output 15b and the inverting input 30b is connected to the non-inverting amplifier output 15a.

The voltage-controlled current source 29 further comprises a non-inverting output 31a and an inverting output 31b. The non-inverting output 31a is connected via the source-drain channel of a fifth MOSFET 32a to the first supply voltage terminal and the inverting output 31b is connected via the source-drain channel of a sixth MOSFET 32b to the first supply voltage terminal. The non-inverting output 31a is connected to a first input of a Miller integrator 33 and the inverting output 31b is connected to a second input of the Miller integrator 33. Furthermore, both of the outputs 31a, 31b are each connected to a terminal of an auxiliary circuit 34. The gates of the fifth MOSFET 32a and of the sixth MOSFET 32b are also connected to the auxiliary circuit 34.

Figure 4:
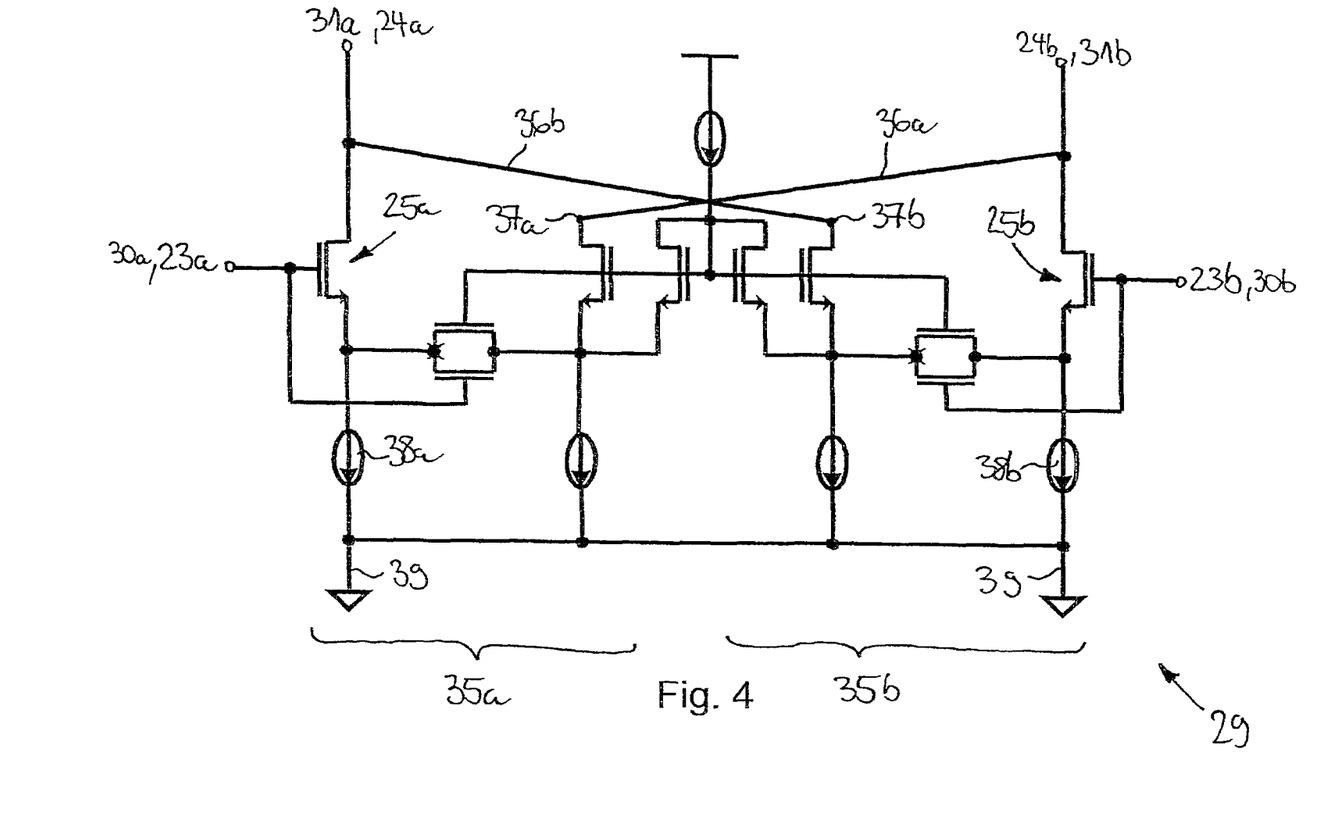
FIG. 4: a circuit diagram of a transconductance amplifier (gm cell) of the low pass.

It can be discerned in FIG. 4 that the voltage-controlled current source 29 comprises a first transconductor 35a and a second transconductor 35b. The non-inverting input terminal 23a of the low pass 22 is connected to an input of the first transconductor 35a and the inverting input terminal 23b of the low pass 22 is connected to an input of the second transconductor 35b.

The non-inverting output terminal 24a of the low pass 22 is connected to the non-inverting output 31a of the first transconductor 35a and the inverting output terminal 24b of the low pass 22 is connected to the inverting output 31b of the second transconductor 35b. The output 31b of the second transconductor 35b is connected via a first feedback branch 36a to a first feedback terminal 37a of the first transconductor 35a and the output 31a of the first transconductor 35a is connected via a second feedback branch 36b to a second feedback terminal 37b of the second transconductor 35b. A better linearization of the measuring signals of the secondary sensors 9a, 9b is achieved by the feedbacks.

The output 31a is connected to a reference potential terminal 39 via a first path comprising a source-drain channel of a first FET 25a and a fourth current source 38a connected in series thereto. The output 31b is connected to the reference potential terminal 39 via a second path comprising a source-drain channel of a second FET 25b and a fifth current source 38b connected in series thereto. The gate of the first FET 38a and the gate of the second FET 38b are connected in each case to a control mechanism, which is configured in such a way that the FETs 38a, 38b are operated below their threshold voltage.

As can be discerned in FIG. 2, operational amplifier 11 of measuring device 8 comprises a first non-inverting auxiliary input 20a in addition to the first amplifier input 13a and a second inverting auxiliary input 20b in addition to the second amplifier input 13b. The second amplifier output 15b is connected to anon-inverting first input terminal 23a of the low pass 22 and the first amplifier output 15a is connected to an inverting second input terminal 23b of the low pass 22. A non-inverting first output terminal 24a of the low pass 22 is connected to the first auxiliary input 20a and an inverting second output terminal 24b of the low pass 22 is connected to the second auxiliary input 20b.

Figure 5:
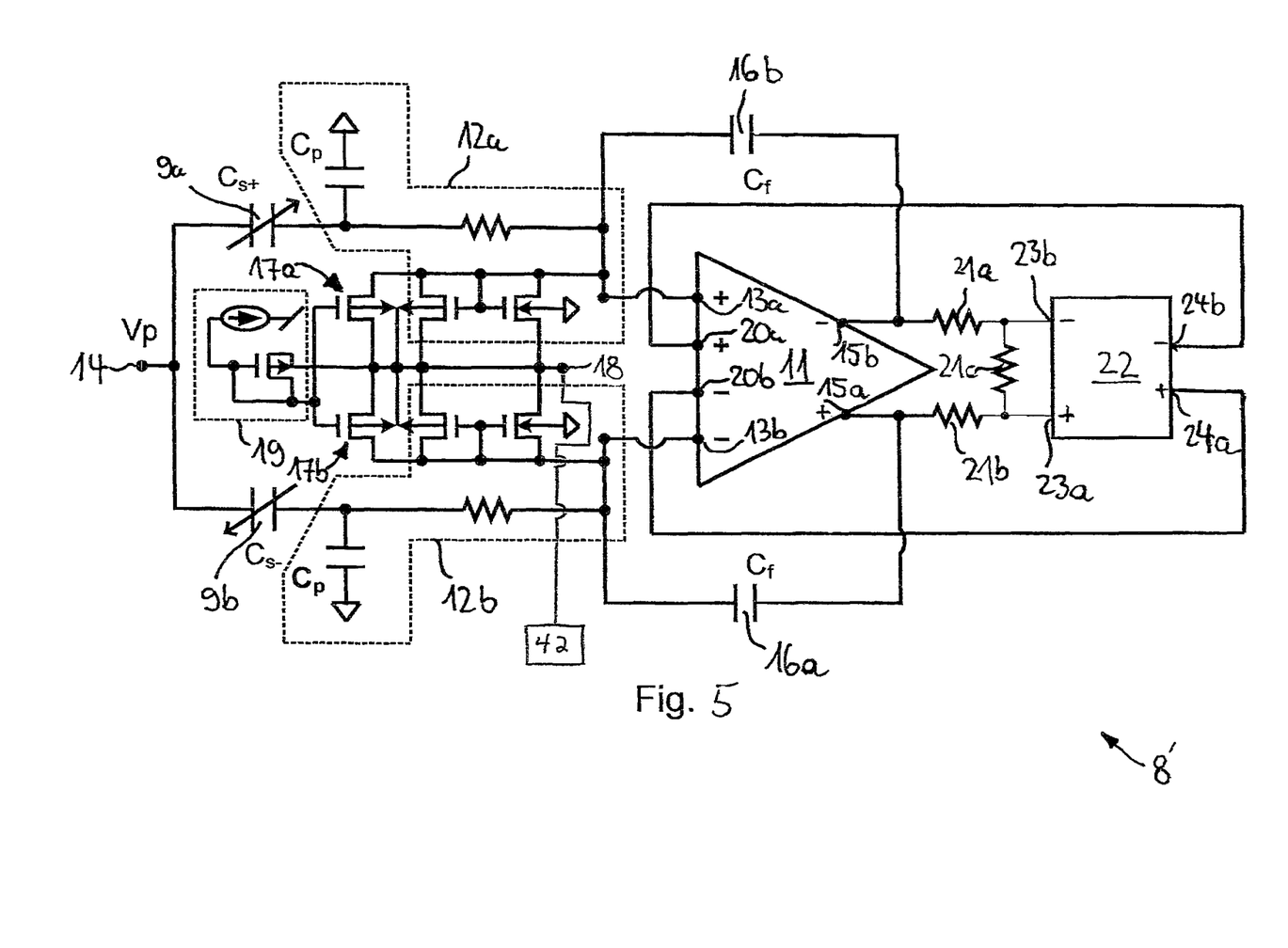
FIG. 5 is a circuit diagram of an alternate embodiment measuring device.

FIG. 5 shows an alternate embodiment measuring device 8' that is similar to measuring device 8 shown in FIG. 2 with the following exceptions. The first amplifier output 15a is connected to the non-inverting first input terminal 23a of the low pass 22 and the second amplifier output 15b is connected to the inverting second input terminal 23b of the low pass 22. The inverting first output terminal 24b of the low pass 22 is connected to the first auxiliary input 20a and the non-inverting second output terminal 24a of the low pass 22 is connected to the second auxiliary input 20b.

The invention claimed is:

1. A measuring device with at least one micro-electromechanical capacitive sensor (9a, 9b) comprising electrodes that move toward and away from each other to measure a mechanical deflection of a test mass (2), with a charge integrator comprising an operational amplifier (11) that has at least one amplifier input (13a, 13b) connected to the capacitive sensor (9a, 9b) and at least one amplifier output (15a, 15b) that is fed back via at least one integration capacitor (16a, 16b) to the amplifier input (13a, 13b), wherein:
the at least one amplifier input (13a, 13b) is connected via an electrical resistor (17a, 17b) to a terminal (18) for an electrical common-mode reference potential which is connected with a reference voltage source (42);
the operational amplifier (11) comprises at least one auxiliary input (20a, 20b) in addition to the at least one amplifier input (13a, 13b); and
the amplifier output (15a, 15b) is connected via a low pass (22) to the at least one auxiliary input (20a, 20b).

2. The measuring device as in claim 1, wherein the electrical resistor (17a, 17b) is formed by a FET, which, with its source-drain channel, connects the amplifier input (13a, 13b) to the terminal (18) for the common-mode reference potential and applies a control voltage with its gate.

3. The measuring device as in claim 2, wherein the control voltage is lower than the threshold voltage of the FET.

4. The measuring device as in claim 2, further comprising a voltage source (19) for generating the control voltage, of which the source output is connected to the gate of the FET, wherein the voltage source (19) has a control input that is control-connected to the terminal (18) for the common-mode reference potential in such a way that an electrical resistance of the source-drain channel of the FET remains substantially constant when a change of the common-mode reference potential occurs.

5. The measuring device as in claim 1, wherein:
the capacitive sensor (9a, 9b) is configured as a differential sensor with a non-inverting first measuring signal output and an inverting second measuring signal output and the operational amplifier (11) is configured as a differential operational amplifier (11) with a non-inverting first amplifier input (13a), an inverting second amplifier input (13b), a non-inverting first amplifier output (15a), and an inverting second amplifier output (15b);
the first measuring signal output is connected to the first amplifier input (13a) and the second measuring signal output is connected to the second amplifier input (13b);
the first amplifier output (15a) is fed back via a first integration capacitor (16a) to the second amplifier input (13b) and the second amplifier output (15b) is fed back via a second integration capacitor (16b) to the first amplifier input (13b); and
the first amplifier input (13a) is connected via a first electrical resistor (17a) and the second amplifier input (13b) is connected via a second electrical resistor (17b) to the terminal (18) for the common-mode reference potential.

6. A gyroscope with a measuring device as in claim 1, with a test mass (2) mounted on a holding device so that it is able to be deflected along a first axis (3) and a second axis (4) running perpendicular thereto and that is set into oscillation about a rest position toward the first axis (3) by means of a vibration exciter, wherein a capacitive sensor (9a, 9b) cooperates with the test mass (2) in such a way that a deflection of the test mass (2) from the rest position toward the second axis (4) is detectable.

7. A measuring device with at least one micro-electromechanical capacitive sensor (9a, 9b) comprising electrodes that move toward and away from each other to measure a mechanical deflection of a test mass (2), with a charge integrator comprising an operational amplifier (11) that has at least one amplifier input (13a, 13b) connected to the capacitive sensor (9a, 9b) and at least one amplifier output (15a, 15b) that is fed back via at least one integration capacitor (16a, 16b) to the amplifier input (13a, 13b), wherein:
the capacitive sensor (9a, 9b) is configured as a differential sensor with a non-inverting first measuring signal output and an inverting second measuring signal output and the operational amplifier (11) is configured as a differential operational amplifier (11) with a non-inverting first amplifier input (13a), an inverting second amplifier input (13b), a non-inverting first amplifier output (15a), and an inverting second amplifier output (15b);
the first measuring signal output is connected to the first amplifier input (13a) and the second measuring signal output is connected to the second amplifier input (13b);
the first amplifier output (15a) is fed back via a first integration capacitor (16a) to the second amplifier input (13b) and the second amplifier output (15b) is fed back via a second integration capacitor (16b) to the first amplifier input (13a);
the first amplifier input (13a) is connected via a first electrical resistor (17a) and the second amplifier input (13b) is connected via a second electrical resistor (17b) to a terminal (18) for an electrical common-mode reference potential;
the operational amplifier (11) further comprises a first non-inverting auxiliary input (20a) in addition to the first amplifier input (13a) and a second inverting auxiliary input (20b) in addition to the second amplifier input (13b);
the second amplifier output (15b) is connected to a non-inverting first input terminal (23a) of a low pass (22) and the first amplifier output (15a) is connected to an inverting second input terminal (23b) of the low pass (22); and
a non-inverting first output terminal (24a) of the low pass (22) is connected to the first auxiliary input (20a) and an inverting second output terminal (24b) of the low pass (22) is connected to the second auxiliary input (20b).

8. The measuring device as in claim 7, wherein:
the second amplifier output (15b) is connected via a first resistor element (21a) to the first input terminal (23a) of the low pass (22) and the first amplifier output (15a) is connected via a second resistor element (21b) to the second input terminal (23b) of the low pass (22); and
the first input terminal (23a) of the low pass (22) is connected via a third resistor element (21c) to the second input terminal (23b) of the low pass (22).

9. The measuring device as in claim 8, wherein the low pass (22) comprises at least one voltage-controlled current source (29), of which an output (31a, 31b) is connected to an integration input of a Miller integrator (33).

10. The measuring device as in claim 9, wherein:
the first input terminal (23a) of the low pass (22) is connected to an input of a first transconductor (35a) and the second input terminal (23b) of the low pass (22) is connected to an input of a second transconductor (35b);
the first output terminal (24a) of the low pass (22) is connected to an output (31a) of the first transconductor (35a) and the second output terminal (24b) of the low pass (22) is connected to an output (31b) of the second transconductor (35b); and
the output (31b) of the second transconductor (35b) is connected via a first feedback branch (36a) to a first feedback terminal (37a) of the first transconductor (35a) and the output (31a) of the first transconductor (35a) is connected via a second feedback branch (36b) to a second feedback terminal (37b) of the second transconductor (35b).

11. The measuring device as in claim 10, wherein:
the first output terminal (24a) of the low pass (22) is connected to a reference potential terminal (39) via a first path comprising a source-drain channel of a first FET (25a) and a current source (38a) connected in series thereto; and
the second output terminal (24b) of the low pass (22) is connected to the reference potential terminal (39) via a second path comprising a source-drain channel of a second FET (25b) and another current source (38b) connected in series thereto; and
the gate of the first FET (25a) and the gate of the second FET (25b) are in each case connected to a control mechanism, which is configured in such a way that the FETs (25a, 25b) are operated below their threshold voltage.

12. A gyroscope with a measuring device as in claim 7, with a test mass (2) mounted on a holding device so that it is able to be deflected along a first axis (3) and a second axis (4) running perpendicular thereto and that is set into oscillation about a rest position toward the first axis (3) by means of a vibration exciter, wherein a capacitive sensor (9a, 9b) cooperates with the test mass (2) in such a way that a deflection of the test mass (2) from the rest position toward the second axis (4) is detectable.

13. A measuring device with at least one micro-electromechanical capacitive sensor (9a, 9b) comprising electrodes that move toward and away from each other to measure a mechanical deflection of a test mass (2), with a charge integrator comprising an operational amplifier (11) that has at least one amplifier input (13a, 13b) connected to the capacitive sensor (9a, 9b) and at least one amplifier output (15a, 15b) that is fed back via at least one integration capacitor (16a, 16b) to the amplifier input (13a, 13b), wherein:
the capacitive sensor (9a, 9b) is configured as a differential sensor with a non-inverting first measuring signal output and an inverting second measuring signal output and the operational amplifier (11) is configured as a differential operational amplifier (11) with a non-inverting first amplifier input (13a), an inverting second amplifier input (13b), a non-inverting first amplifier output (15a), and an inverting second amplifier output (15b);
the first measuring signal output is connected to the first amplifier input (13a) and the second measuring signal output is connected to the second amplifier input (13b);
the first amplifier output (15a) is fed back via a first integration capacitor (16a) to the second amplifier input (13b) and the second amplifier output (15b) is fed back via a second integration capacitor (16b) to the first amplifier input (13a);
the first amplifier input (13a) is connected via a first electrical resistor (17a) and the second amplifier input (13b) is connected via a second electrical resistor (17b) to a terminal (18) for an electrical common-mode reference potential;
the operational amplifier (11) further comprises a first non-inverting auxiliary input (20a) in addition to the first amplifier input (13*a*) and a second inverting auxiliary input (20*b*) in addition to the second amplifier input (13*b*);

the first amplifier output (15*a*) is connected to a non-inverting first input terminal (23*a*) of a low pass (22) and the second amplifier output (15*b*) is connected to an inverting second input terminal (23*b*) of the low pass; and an inverting first output terminal (24*b*) of the low pass (22) is connected to the first auxiliary input (20*a*) and a non-inverting second output terminal (24*a*) of the low pass (22) is connected to the second auxiliary input (20*b*).

14. The measuring device as in claim 13, wherein:

the second amplifier output (15*b*) is connected via a first resistor element (21*a*) to the first input terminal (23*a*) of the low pass (22) and the first amplifier output (15*a*) is connected via a second resistor element (21*b*) to the second input terminal (23*b*) of the low pass (22); and the first input terminal (23*a*) of the low pass (22) is connected via a third resistor element (21*c*) to the second input terminal (23*b*) of the low pass (22).

15. The measuring device as in claim 14, wherein the low pass (22) comprises at least one voltage-controlled current source (29), of which an output (31*a*, 31*b*) is connected to an integration input of a Miller integrator (33).

16. The measuring device as in claim 15, wherein:

the first input terminal (23*a*) of the low pass (22) is connected to an input of a first transconductor (35*a*) and the second input terminal (23*b*) of the low pass (22) is connected to an input of a second transconductor (35*b*);

the first output terminal (24*a*) of the low pass (22) is connected to an output (31*a*) of the first transconductor (35*a*) and the second output terminal (24*b*) of the low pass (22) is connected to an output (31*b*) of the second transconductor (35*b*); and the output (31*b*) of the second transconductor (35*b*) is connected via a first feedback branch (36*a*) to a first feedback terminal (37*a*) of the first transconductor (35*a*) and the output (31*a*) of the first transconductor (35*a*) is connected via a second feedback branch (36*b*) to a second feedback terminal (37*b*) of the second transconductor (35*b*).

17. The measuring device as in claim 16, wherein:

the first output terminal (24*a*) of the low pass (22) is connected to a reference potential terminal (39) via a first path comprising a source-drain channel of a first FET (25*a*) and a current source (38*a*) connected in series thereto; and the second output terminal (24*b*) of the low pass (22) is connected to the reference potential terminal (39) via a second path comprising a source-drain channel of a second FET (25*b*) and another current source (38*b*) connected in series thereto; and the gate of the first FET (25*a*) and the gate of the second FET (25*b*) are in each case connected to a control mechanism, which is configured in such a way that the FETs (25*a*, 25*b*) are operated below their threshold voltage.

18. A gyroscope with a measuring device as in claim 13, with a test mass (2) mounted on a holding device so that it is able to be deflected along a first axis (3) and a second axis (4) running perpendicular thereto and that is set into oscillation about a rest position toward the first axis (3) by means of a vibration exciter, wherein a capacitive sensor (9*a*, 9*b*) cooperates with the test mass (2) in such a way that a deflection of the test mass (2) from the rest position toward the second axis (4) is detectable.

* * * * *